United States Patent [19]
Lyras

[11] Patent Number: 5,269,424
[45] Date of Patent: Dec. 14, 1993

[54] MOBILE SEPARATION METHOD SYSTEM FOR ABRASIVE BLASTING MATERIAL

[75] Inventor: Gus Lyras, Lowellville, Ohio
[73] Assignee: Corcon, Lowellville, Ohio
[21] Appl. No.: 968,363
[22] Filed: Oct. 29, 1992

Related U.S. Application Data

[63] Continuation-in-part of Ser. No. 721,700, Jun. 26, 1991, Pat. No. 5,185,960.

[51] Int. Cl.⁵ ............................................. B07B 13/00
[52] U.S. Cl. ............................................. 209/2; 209/12; 209/38; 209/39; 209/935; 51/425
[58] Field of Search ............... 209/2, 12, 36, 37, 38, 209/39, 935; 51/424, 425

[56] References Cited

U.S. PATENT DOCUMENTS

| | | |
|---|---|---|
| 2,810,991 | 10/1957 | Mead et al. |
| 3,716,946 | 2/1973 | Graf. |
| 3,934,374 | 1/1976 | Leliaert. |
| 3,970,546 | 7/1976 | Webb et al. ............ 209/12 X |
| 4,387,019 | 6/1983 | Dale et al. ............ 209/38 X |
| 4,449,331 | 5/1984 | MacMillan. |
| 4,668,381 | 5/1987 | Julius ............ 209/39 |
| 4,773,189 | 9/1988 | MacMillan et al. |
| 4,809,854 | 3/1989 | Tomaszek ............ 209/30 X |
| 4,851,129 | 7/1989 | Griffiths et al. ............ 209/2 X |
| 4,943,368 | 7/1990 | Gilbert et al. |
| 5,035,089 | 7/1991 | Tillman et al. ............ 209/12 X |
| 5,035,331 | 7/1991 | Paulson ............ 209/39 X |
| 5,049,260 | 9/1991 | Spears ............ 209/2 |
| 5,071,541 | 12/1991 | Thompson ............ 209/2 |
| 5,074,992 | 12/1991 | Clinton ............ 209/12 |

Primary Examiner—D. Glenn Dayoan
Attorney, Agent, or Firm—Harpman & Harpman

[57] ABSTRACT

A process and apparatus for separation and recovery of used abrasive blasting material having intrained contaminate recovered from a work site. The intrained contaminates are removed by a self-contained multi-step separation process using magnetic vibratory and airwash separating apparatus including static neutralization interconnected by transfer apparatus and storage bins.

5 Claims, 3 Drawing Sheets

MOBILE SEPARATION METHOD SYSTEM FOR ABRASIVE BLASTING MATERIAL

This is a continuation in part of Ser. No. 07/721,700, filed Jun. 26, 1991, now U.S. Pat. No. 5,185,960.

BACKGROUND OF THE INVENTION

1. Technical Field

This device and process relates to separation systems developed to recycle steel abrasive blast material by removing contaminates such as dust, paint, rust, etc. created during the pressure blasting process in which it is used.

2. Description of Prior Art

Prior art devices and processes of this type have relied on a variety of fixed and mobile separation apparatus that require the spent contaminated abrasive material either to be transported to a separate site and processed or processed on site on a continuing in use basis such as would be found in close circulation system, see for example U.S. Pat Nos. 4,943,368, 4,773,189, 4,449,331, 3,716,941, 2,810,991 and 3,934,374.

In U.S. Pat. No. 4,773,189 a separation system is disclosed for polymer blasting media which is cited to show multiple tasks separation system in which a contaminated blast products are collected, processed and reused in a continuous manner. The hazardous contaminates being directed to separate disposable storage units within the process.

Prior art U.S. Pat. No. 3,716,946 uses a recirculation close system with air separation as the initial separation with a secondary magnetic separator for removable of ferrous shot from the remaining non-ferrous contaminates.

U.S. Pat. No. 4,449,331 shows shot blasting machinery used in communication with a blast cabinet module. The device is characterized by a feed and lift conveyor recirculating system in communication with the blast cabinet for transportation of spent contaminated shot to the top of a vertical separation stack.

In U.S. Pat. No. 4,943,368 a non-metallic abrasive blasting material recovering process is disclosed having multiple steps of size classification, ferro-magnetic separation, gravity separation, electrostatic separation which is used in separation of non-conductive paint from conductive blasting media.

In U.S. Pat. No. 3,934,374 a sand blast reclamation system is disclosed using an airwash separator feeding a blast wheel. Contaminated air is directed to a fabric dust collector for filtration. A sand separator is positioned above the magnetic separator supplying usable sand back to the blast wheel via an internal elevator belt.

Finally, in U.S. Pat. No. 2,810,991 an abrasive blasting apparatus is disclosed that provides for a movable self-contained blasting and separation unit that recovers the spent contaminated shot as it is used and recirculates same through a separation process. The separator uses an air driven grit reclaimer in combination with a transfer chamber.

Prior art also shows mobile self-contained blasting units such as the Alpha 2000 Series manufactured by IPEC which is an attempt to provide a self-contained mobile separator in which interconnected steps are utilized to classify and clean shot from the contaminated material.

SUMMARY OF THE INVENTION

A waste separation process and apparatus for physically removing waste contaminate materials from the residue of abrasive steel shot blasting. The separation apparatus and process used within comprises a self-contained mobile treatment device using multiple steps separation processes. A modified magnetic particle separator and vibratory screen supplies a multi-airwash separation process having static neutralization to separate the steel shot blast material remaining from foreign intrained contaminates. The clean blast material is then stored within the apparatus for later transfer and reuse.

DESCRIPTION OF THE PREFERRED EMBODIMENT

Figure 1:
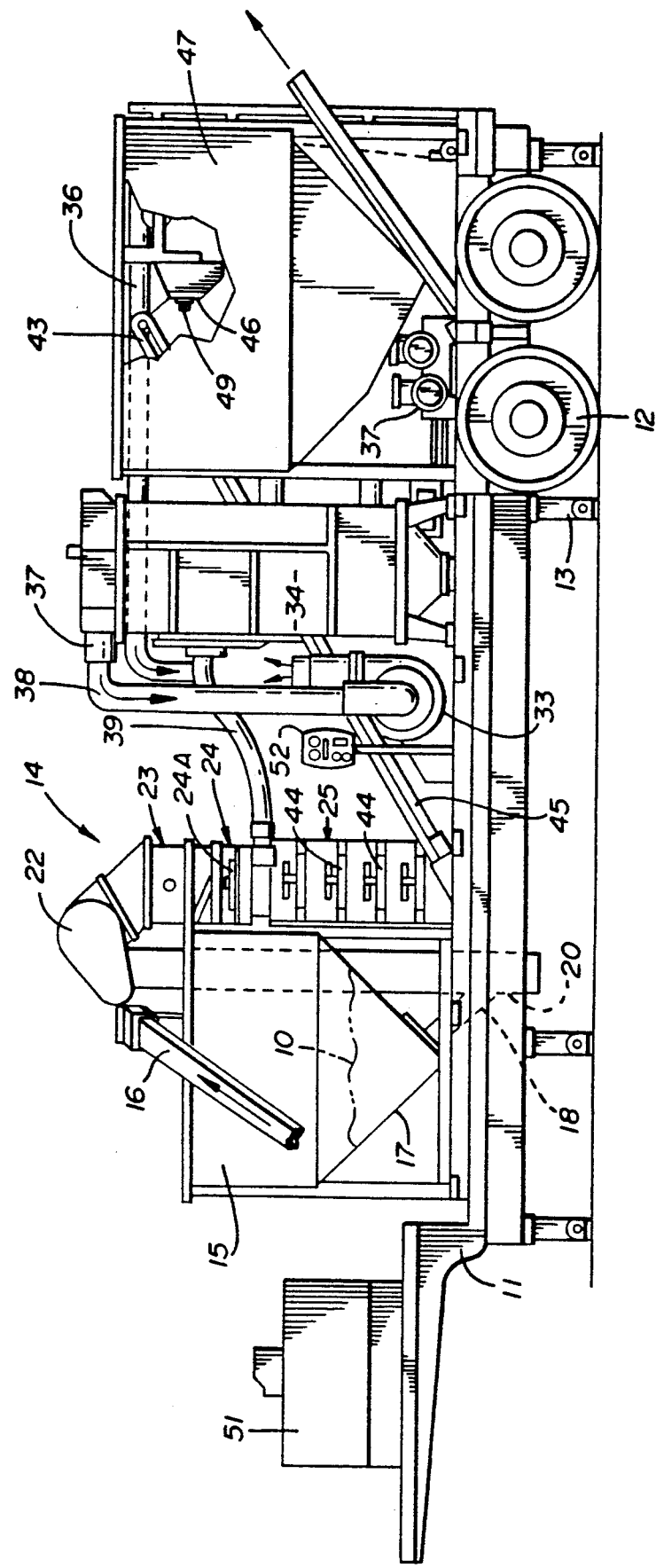
FIG. 1 is a side plan view of the mobile separator.
Figure 2:
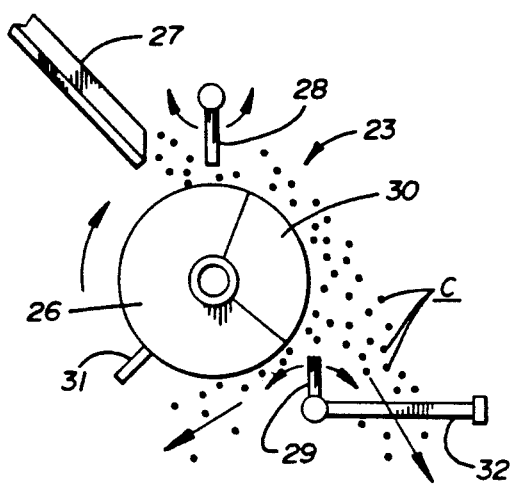
FIG. 2 is a graphic illustration representing a magnetic separator used within the apparatus.

A process and mobile apparatus for separation and recovery of steel blasting shot materials, the mobile apparatus comprises a self-contained trailer 11 having wheels and axle assembly 12, multiple telescopically extensible trailer stabilizer arms 13 extend from said trailer 11 and can be deployed therefrom stabilizing the trailer 11 during use. A separator apparatus 14 is mounted on said trailer 11 and comprises unclassified grit holding bin 15 into which used abrasive blast material 10 shown in broken lines is initially deposited via supply conveyors 16 which will be described in greater detail later. The grit holding bin 15 has a conical lower portion 17 with an outlet gate and a trough 18. A bucket elevator 19 having an infeed hopper 20, best seen in FIG. 1 of the drawings, is aligned with the gate and trough 18 and extends through said grit holding bin 15 lifting said used abrasive blasting material 10 with intrained contaminates for delivery to the separation stage of the device.

The bucket elevator 19 is well known within the art and is characterized as having an endless belt 20A with multiple material buckets 21 positioned thereon. An example of same is available through Universal Industries of Cedal Fall, Iowa at model no. UI-220 having a free flowing material capacity of 220 CFH's. A drive motor assembly 22 drives the bucket elevator 19 as best seen in FIG. 1 of the drawings.

Figure 5:
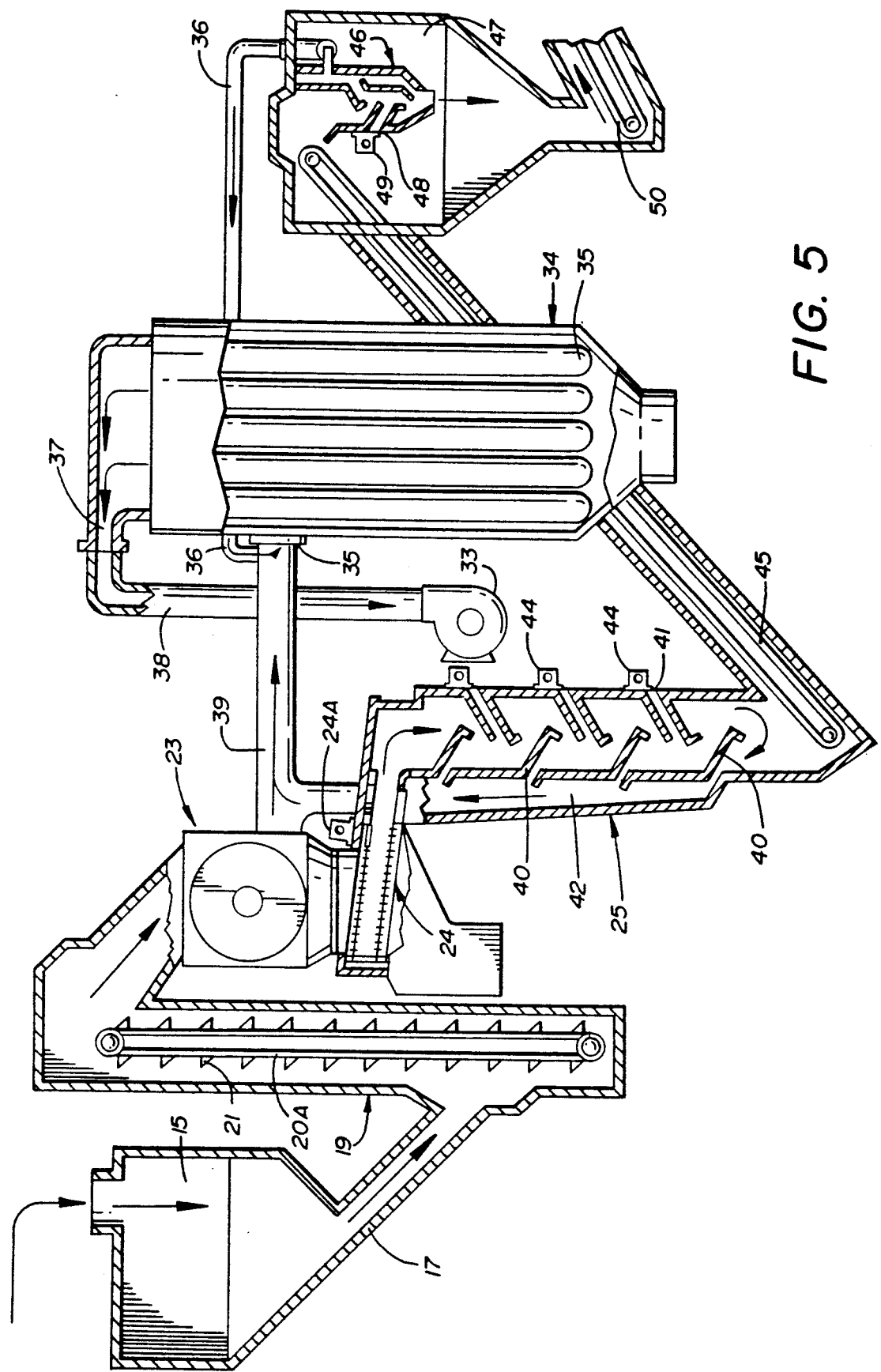
FIG. 5 is an illustrative flow path diagram showing a modified cross-section, the complete separation system and multiple steps contained therein.

Referring now to FIG. 5 of the drawings, the process flow path for the used abrasive 10 is shown through the mobile apparatus for illustration purposes only.

Figure 3:
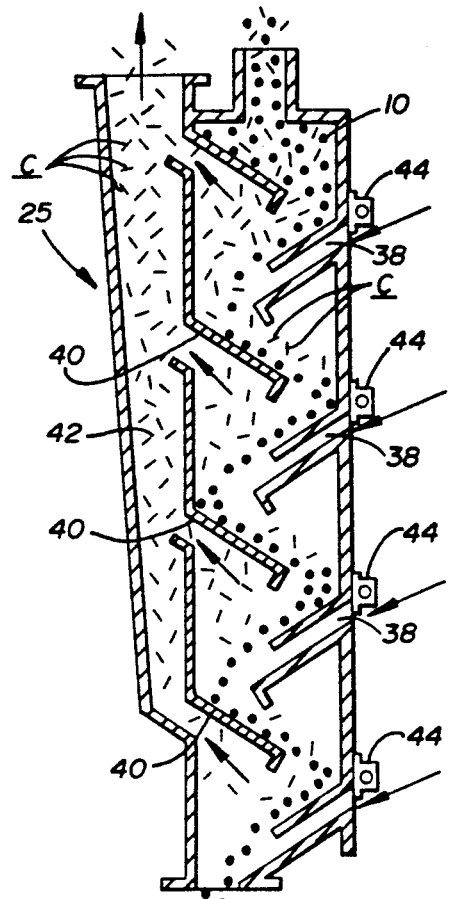
FIG. 3 is a cut-a-way illustrative view of one of the multiple airwash devices used.
Figure 4:
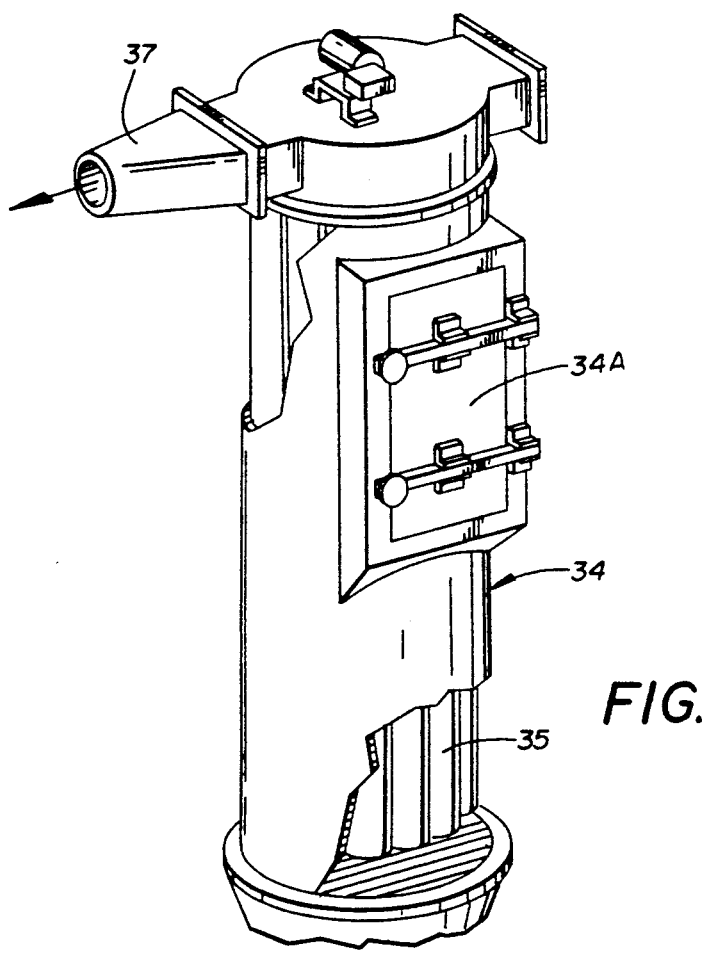
FIG. 4 is a perspective view with parts cut-a-way of the central dust collector.

The separation stage comprises an initial magnetic drum separator 23, a vibrator screen separator 24 and multi-airwasher 25, best seen in FIG. 3 of the drawings. The magnetic drum separator 23 is a modified form of a typical magnetic separation device available to those within the art, an example is known as a Perma Drum Type FC supplied by Dings Company of Milwaukee, Wisc.

The magnetic drum separator 23 has a drum 26 and a shoot 27 with a feed lever arm 28 and an adjustable product outlet splitter 29. A portion of the drum surface is magnetized at 30 so that as the contaminated used abrasive blasting material 10 is supplied to the drum surface 30, non-magnetic contaminates C will be separated therefrom and diverted by the adjustable splitter 29 as is well known within the art. An additional wiper blade assembly 31 is adapted to engage the drum surface past the normal point of separation to assure that the ferrous material is clean from the drum 26 as it rotates. A remote adjustable handle 32 is provided for outside adjustment to the product outlet splitter 29 normally found on this type of magnetic separator.

The contaminates C separated by the magnetic drum separator 23 are removed by a vacuum dust control system interconnected to the separation stage through the magnetic drum separator 23 and the vibratory screen separator 24 as best seen in FIGS. 1 and 5 of the drawings.

The vacuum dust control system comprises a central fan blower 33 interconnected to a high pressure dust filter 34 having air inlets 35 and 36 and an outlet 37. The high pressure dust filter 34 has multiple filter bags 35 within and an access door 34A as is well known within the art. An example of such a high pressure dust filter 34 is manufactured by Kice Industries of Wichitaw, Kan., as model no. HR 24-6.

An air compressor 37 is required for the separation process and specifically for the operation of the high pressure dust filter 34 hereinbefore described as will be well understood by those skilled in the art.

The central drive fan blower 33 is connected to said outlet 37 on the high pressure dust filter 34 via flexible hose 38. A second flexible hose 39 connects the inlet 35 with a magnetic drum separator 23 as noted above.

The products of magnetic drum separator 23 including the abrasive blast material is directed into the vibratory screen separator 24, best seen in FIG. 5 of the drawings, that screens the products of the magnetic drum separator 23 by size selection, an example of such screening feeders is manufactured by Eriez Magnetics of Erie, Pa. as model no. 65B vibratory feeder.

A static neutralization curtain transvector bar 24A is secured to the vibratory screen separator 24 to reduce the residual static charge within the products of the magnetic drum separator 23 as it passes therefrom. The static neutralization curtain transvector bar 24A will be described in more detail hereinafter.

The separated abrasive blast material 10 and remaining contaminates drop directly into the multi-airwasher 25 as best seen in FIGS. 3 and 5 of the drawings. The multiple airwasher 25 is well known within the art and is comprised of a vertical chamber having multiple deflecting angularly positioned vanes 40 each of which is positioned adjacent an outside air inlet 41 to affect a specific gravity air separation of the contaminated blast material as it cascades downwardly through the airwasher 25. The intrained lighter weight contaminates C are forced upwardly through a return and removable passage 42 to be drawn off by the hereinbefore described high pressure dust filter 34 interconnected through said magnetic drum separator 23 and said vibratory screen separator 24.

Static neutralization curtain transvectors 44 are positioned adjacent the outside of the respective air inlets 41 on the airwasher 25. The static neutralization curtain transvector bars 44 neutralize static charge by breaking the air near the transvectors into positive and negative air ions which are attracted to and neutralized charged surfaces. Such devices are well known in the art and an examples of such is manufactured by Simco Company of Hatfield, Pa. under model no. F167.

A material conveyor 45 receives the separated blast material 10 from the multiple airwasher 25 and transfers same to a secondary airwasher 46 positioned within a holding bin 47 near the high pressure dust filter 34 hereinbefore described. The secondary airwasher 46 is a simple two-step device that has a single air inlet 48 and static neutralization curtain transvector bar 49 providing a final airwash and neutralization to the abrasive blast material 10. The remaining contaminates C are drawn away from the secondary airwasher 44 via the inlet line 36 from the high pressure dust filter 34.

A secondary material conveyor 50 is positioned on the trailer 11 to receive an outflow of the clean abrasive blast shot material from the holding bin 47 for transfer to mobile transport storage bins (not shown) used within the industry to move the clean abrasive blast material to the nearby work site, such as a bridge.

In operation, contaminated abrasive blast shot 10 is collected from the work site and transferred to the initial holding bin 15 to begin the separation recycling process.

A diesel generator 51 is positioned on the trailer 11 to provide electrical power through a control and command system (not shown) to the hereinbefore described components of the mobile separation system for abrasive blast material via a main control panel 52.

Although it will be apparent to those skilled in the art that various individual components of the mobile separation system for abrasive blast material are each well known and understood, it is this new and novel combination and interdependent adaptation and modification of the given elements in a self-contained mobile system that is the subject of the invention.

Only this system allows for reduced load factors and equipment required for use in bridge abrasive blasting which by its very nature loads the structure with additional weight.

It will thus be seen that a new and novel mobile separation system for abrasive blasting material has been illustrated and described and it will be apparent to those skilled in the art that various changes and modifications may be made therein without departing from the spirit of the invention, therefore

I claim:

1. An apparatus for separation and recovery of contaminated abrasive blasting material comprises in combination a self-contained mobile trailer assembly, a separation apparatus on said trailer assembly, said separation apparatus comprising a magnetic separator, a vibratory screen separator and a primary and second airwash assemblies, said magnetic separator having a drum, at least one wiper blade engageable on said drum past a point of contaminated separation, a remote control product splitter, said primary airwash assembly having multiple spaced angularly inclined deflecting vanes and associated make-up inlets, each of said make-up air inlets having a static neutralization curtain transvector positioned adjacent thereto, said vibratory screen separator having a static neutralization transvector positioned thereon, means for transferring said abrasive blasting material from said primary airwash assembly to said second airwash assembly, a dust collector interconnected to said magnetic separator and said primary and secondary airwash assemblies, and a vacuum source for drawing off contaminates therefrom, transfer and storage means comprising multiple conveyor and storage bins, said secondary airwash assembly positioned in one of said storage bins, a source of electrical power and control for said separation apparatus, means for interconnecting said source of vacuum with said dust collector and said magnetic drum separator and said primary and secondary airwash assemblies and said vibratory screen separator.

2. An apparatus for separation and recovery of contaminated abrasive blasting material of claim 1 wherein said dust collector and source of vacuum comprises a high pressure filter having an inlet and an outlet, multiple filter bags and a blower interconnected thereto.

3. An apparatus for separation and recovery of contaminated abrasive blasting material of claim 1 wherein said source of electrical power comprises a self-contained mobile generator on said trailer assembly and said trailer assembly has multiple stabilizer arms, telescopically extensible therefrom.

4. An apparatus for separation and recovery of contaminated abrasive blasting material of claim 1 wherein said means for transferring said abrasive blasting material from said primary airwash to said secondary airwash comprises a material conveyor extending therebetween.

5. A process for separation and recovery of contaminated abrasive blasting material wherein said process comprises the steps of (a) transferring contaminated abrasive blasting material to a mobile self-contained separation recovering apparatus,
(b) separating ferrous and non-ferrous material by a magnetic separator from said contaminated abrasive blasting material,
(c) separating contaminate within said abrasive ferrous material by a vibratory screen separator and specific gravity,
(d) static neutralization of said abrasive ferrous material and contaminates in said vibratory screen separator,
(e) removing airborne contaminates from said magnetic separator and vibratory screen separator through a primary specific gravity separator,
(f) static neutralization of abrasive ferrous materials and contaminates within said primary specific gravity separator,
(g) transferring said airborne contaminates to a filter media,
(h) filtering said airborne contaminates and exhausting clean air to atmosphere,
(i) transferring said abrasive ferrous material from said primary specific gravity separator to a secondary specific gravity separator,
(j) secondary separation of contaminates within said abrasive blasting material by said secondary specific gravity separator,
(k) transferring clean abrasive blasting material into a holding bin.

* * * * *